United States Patent
Kim et al.

(10) Patent No.: US 12,445,841 B2
(45) Date of Patent: Oct. 14, 2025

(54) METHOD AND DEVICE FOR OBTAINING, MANAGING, AND VERIFYING USER CONSENT FOR EXTERNAL PROVISION OF USER DATA ANALYSIS INFORMATION

(71) Applicant: LG ELECTRONICS INC., Seoul (KR)

(72) Inventors: Dongjoo Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 18/026,728

(22) PCT Filed: Sep. 7, 2021

(86) PCT No.: PCT/KR2021/012093
§ 371 (c)(1),
(2) Date: Mar. 16, 2023

(87) PCT Pub. No.: WO2022/059987
PCT Pub. Date: Mar. 24, 2022

(65) Prior Publication Data
US 2023/0345244 A1    Oct. 26, 2023

(30) Foreign Application Priority Data
Sep. 18, 2020    (KR) ........................ 10-2020-0120734

(51) Int. Cl.
*H04W 12/06*    (2021.01)
*H04W 12/062*    (2021.01)
*H04W 12/106*    (2021.01)

(52) U.S. Cl.
CPC ....... *H04W 12/062* (2021.01); *H04W 12/106* (2021.01)

(58) Field of Classification Search
CPC ... H04W 12/062; H04W 12/106; H04W 8/16; H04W 8/18; H04W 12/02; H04W 12/06;
(Continued)

(56) References Cited

U.S. PATENT DOCUMENTS

2007/0162757 A1* 7/2007 Mache ................. H04L 63/061
                                                    713/176
2015/0249932 A1   9/2015 Rácz et al.
(Continued)

FOREIGN PATENT DOCUMENTS

WO    2020/066890 A1    4/2020

OTHER PUBLICATIONS

"3rd Generation Partnership Project; Technical Specification Group Services and System Aspects; Study on enablers for network automation for the 5G System (5GS); Phase 2 (Release 17)", 3GPP TR 23.700-91 V1.0.0 (Sep. 2020), Sep. 11, 2020, see sections 6.3.1.2 and 6.76.2.1; and figures 6.3.1.2-1 and 6.76.2.1-1.
(Continued)

*Primary Examiner* — Izunna Okeke
(74) *Attorney, Agent, or Firm* — BRYAN CAVE LEIGHTON PAISNER LLP

(57) ABSTRACT

Provided are a method and device for obtaining, managing, and verifying user consent for external provision of user analytics. Unified data management (UDM) receives, from a network data analytics function (NWDAF), a first request message for whether consent of a specific user has been received with respect to data request collection for the specific user, which is requested by an application function (AF), and transmitting a first response message including a parameter indicating the presence or absence of user consent to the NWDAF. In this case, the parameter indicates that there is no consent of the specific user. The UDM also receives, from the AF, a second request message including
(Continued)

an ID of the specific user, consent acquired from the specific user, and HASH, and updating the parameter indicating the presence or absence of user consent, based on the consent acquired from the specific user.

14 Claims, 9 Drawing Sheets

(58) Field of Classification Search
CPC ....... H04W 12/10; H04W 88/18; H04W 8/08; H04W 12/04; H04W 24/02; H04L 9/3236
See application file for complete search history.

(56) References Cited

U.S. PATENT DOCUMENTS

| | | | |
|---|---|---|---|
| 2023/0297717 A1* | 9/2023 | Kunzmann | G06F 21/64 726/28 |
| 2023/0319533 A1* | 10/2023 | Ly | H04L 43/04 709/224 |

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288 V16.4.0 (Jul. 2020), Jul. 9, 2020, see sections 6.2.2.3 and 6.7.2.4; and figure 6.7.2.4-1.

"3rd Generation Partnership Project; Technical Specification Group Services and System Aspects; Telecommunication management; Subscriber and equipment trace; Trace control and configuration management (Release 16)", 3GPP TS 32.422 V16.2.0 (Jul. 2020), Jul. 10, 2020, see section 4.9.2; and figure 4.9.2.1.

"3rd Generation Partnership Project; Technical Specification Group Services and System Aspects; Architecture enhancements for 5G System (5GS) to support network data analytics services (Release 16)", 3GPP TS 23.288 V16.3.0 (Mar. 2020), see sections 4 and 5 and section 6.7.2.

China Mobile et al., "New SID on security aspects of enablers for Network Automation (eNA) for the 5G System (5GS) Phase 2", S3-202256, 3GPP TSG-SA3 Meeting #100e, e-meeting, Aug. 17-28, 2020.

3GPP TR 23.700-91 V0.5.0, 3rd Generation Partnership Project; Technical Specification Group Services and System Aspects; Study on enabler for network automation for the 5G System (5GS); Phase 2 (Release 17), Sep. 2020.

NEC, Convida Wireless, "New Key Issue: User consent for analytics collection from the UEs", SA WG2 Meeting #136-AH, S2-2000314, Jan. 13-17, 2020, Incheon, South Korea.

Nokia, Nokia Shanghai Bell, "KI #15, New Solution: User consent revocation", SA WG2 Meeting #140E, S2-2005794, Aug. 19-Sep. 2, 2020, Elbonia.

NEC, Convida Wireless, "Solution KI#X—User consent for UE analytics collection", SA WG2 Meeting #136-AH, S2-2000315, Jan. 13-17, 2020, Incheon, South Korea.

Huawei, HiSilicon, NEC, Convida Wireless, China Mobile, China Telecom, "Key issue on user's consent of data collection and data analytic", SA WG2 Meeting #136AH, S2-2001207, Incheon, Korean, Jan. 12, 2020.

* cited by examiner

METHOD AND DEVICE FOR OBTAINING, MANAGING, AND VERIFYING USER CONSENT FOR EXTERNAL PROVISION OF USER DATA ANALYSIS INFORMATION

CROSS-REFERENCE TO RELATED APPLICATIONS

This application is the National Stage filing under 35 U.S.C. 371 of International Application No. PCT/KR2021/012093, filed on Sep. 7, 2021, which claims the benefit of and priority to Korean Patent Application No. 10-2020-0120734, filed on Sep. 18, 2020, which is hereby incorporated by reference herein in its entirety.

TECHNICAL FIELD

The present disclosure relates to a method and device for obtaining, managing, and verifying user consent for external provision of user data analytics.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

To address the increased complexity of network operations in 5th generation mobile networks through automated network data analysis, 3GPP is defining a Network Data Analytics Function (NWDAF) in Rel-16 and discussing network data collection/analytics interfaces and data analytics use cases.

SUMMARY

When collecting data from NWDAF, user consent may be an issue. In particular, user consent may be necessary if an external service provider wishes to collect security-sensitive user data. Accordingly, user consent to collect and analyze user data may be supported for the security of some user data, and measures to obtain, verify, and manage such user consent are required.

In an aspect, a method performed by a Unified Data Management (UDM) operating in a wireless communication system is provided. The method comprises, for a data request collection for a specific user requested by an Application Function (AF), receiving, from a Network Data Analytics Function (NWDAF), a first request message about whether consent has been received from the specific user, and in response to the first request message, transmitting, to the NWDAF, a first response message including a user consent parameter stored in subscription information of the specific user. The user consent parameter informs that the specific user does not have consent. The method further comprises, receiving, from the AF, a second request message including an ID of the specific user, the consent obtained from the specific user, and a HASH, and updating the user consent parameter stored in the subscription information of the specific user based on the consent obtained from the specific user.

In another aspect, a method performed by a User Equipment (UE) operating in a wireless communication system is provided. The method comprises, based on absence of prior consent to a data request collection for the UE, receiving, from an Application Function (AF), a request for consent to the data request collection, and based on consenting to the data request collection, transmitting a message, to the AF, informing consent to the data request collection, together with a HASH for verifying integrity of the message.

In another aspect, an apparatus implementing the above method is provided.

The present disclosure can have various advantageous effects.

For example, if an external service utilizes user data stored and managed by network, the necessary user consent can be obtained verifiably.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
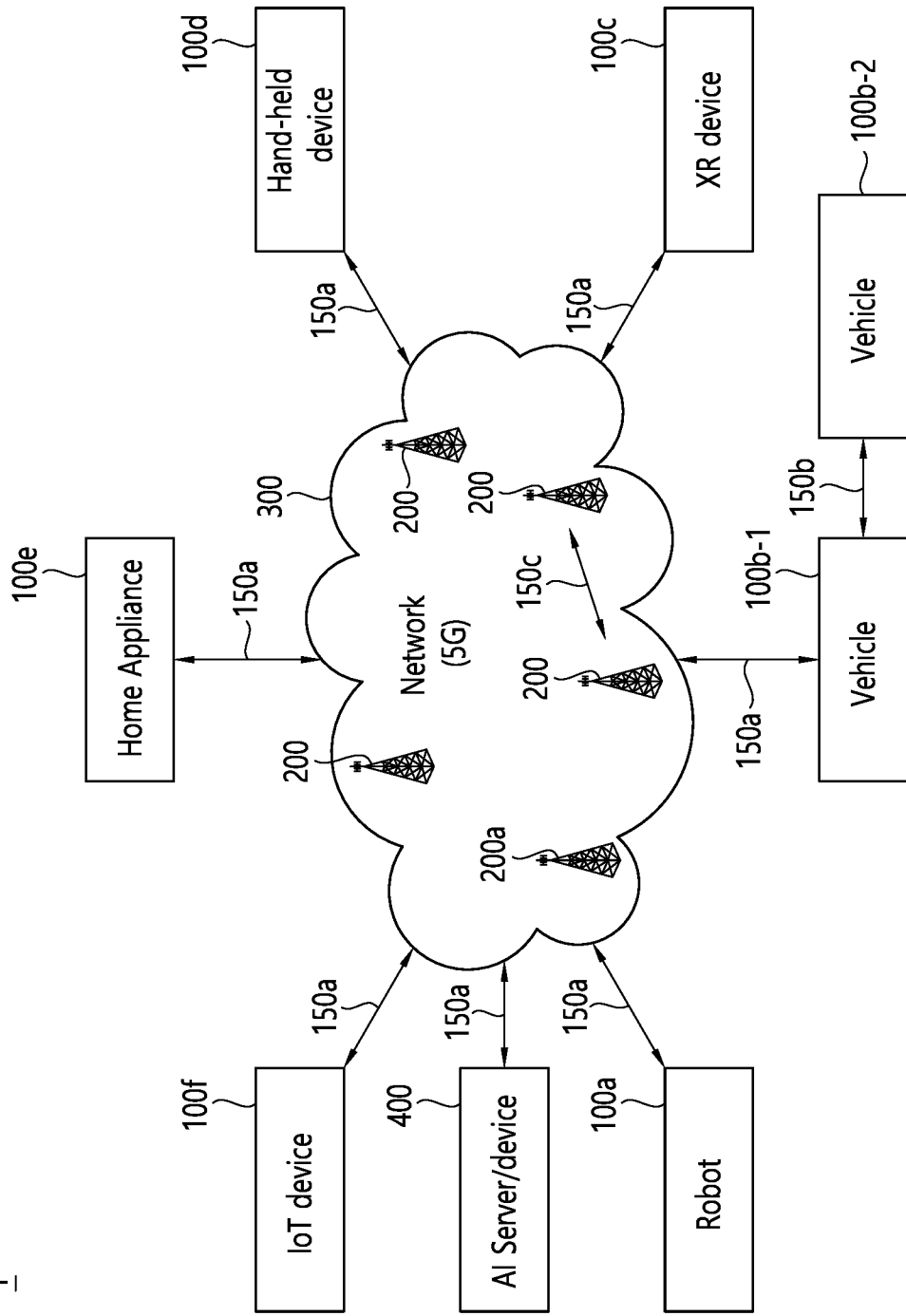
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
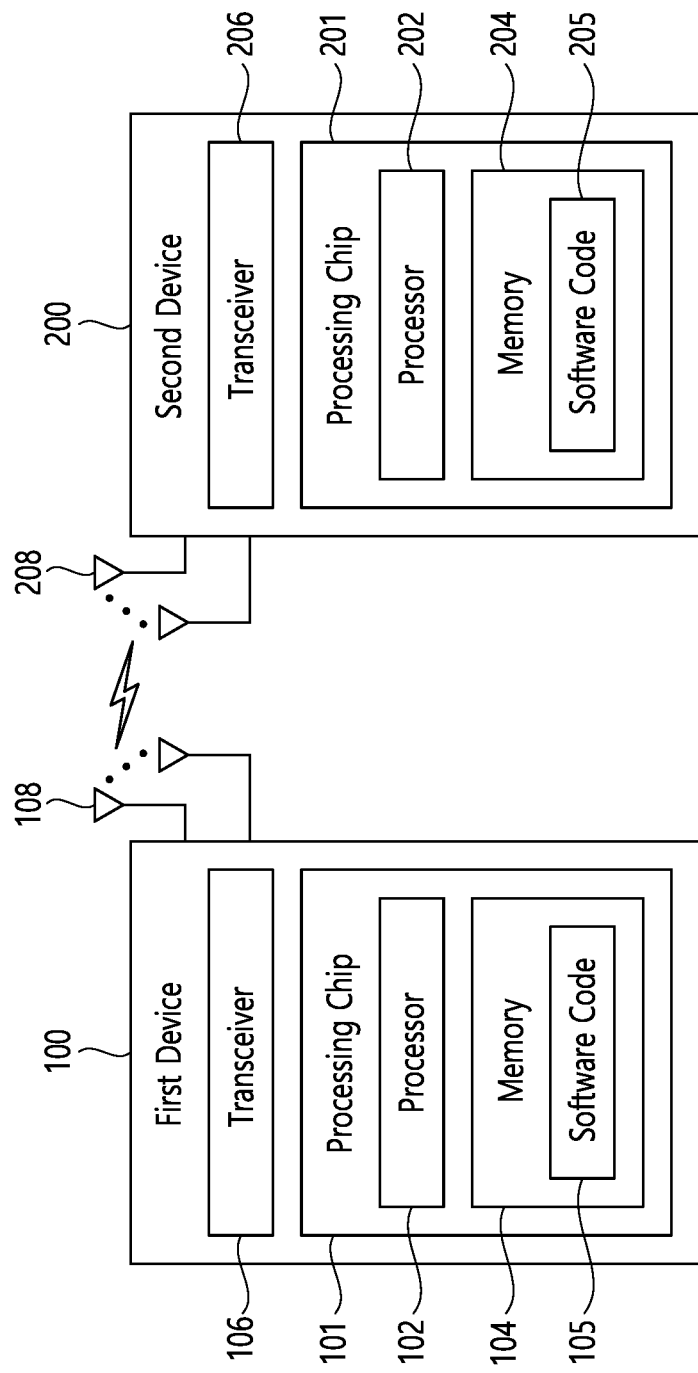
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
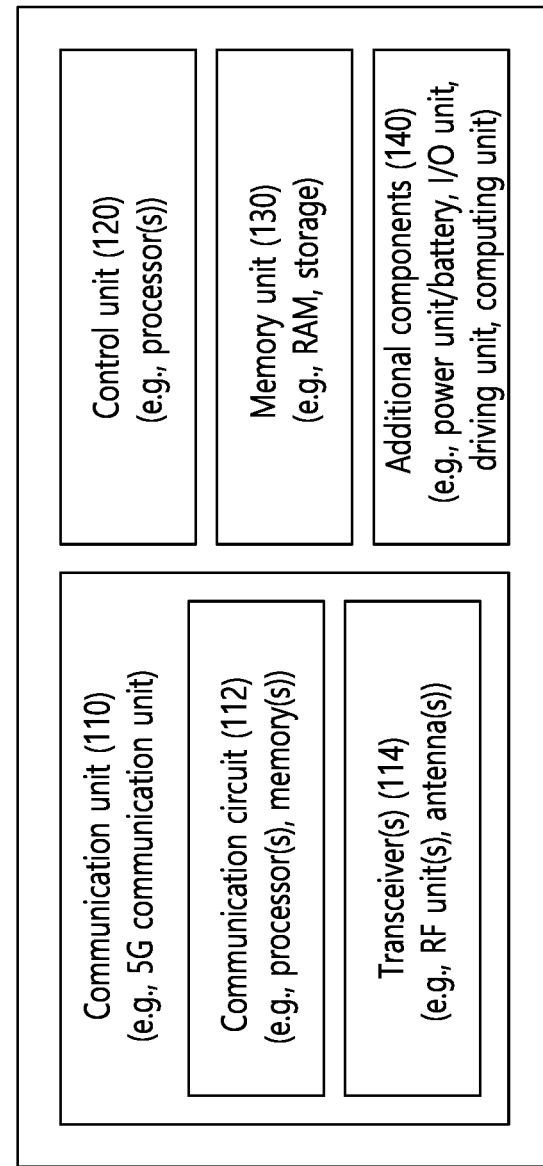
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a dynamic RAM (DRAM), a ROM, a flash memory, a volatile memory, a non-volatile memory, and/or a combination thereof.

Figure 4:
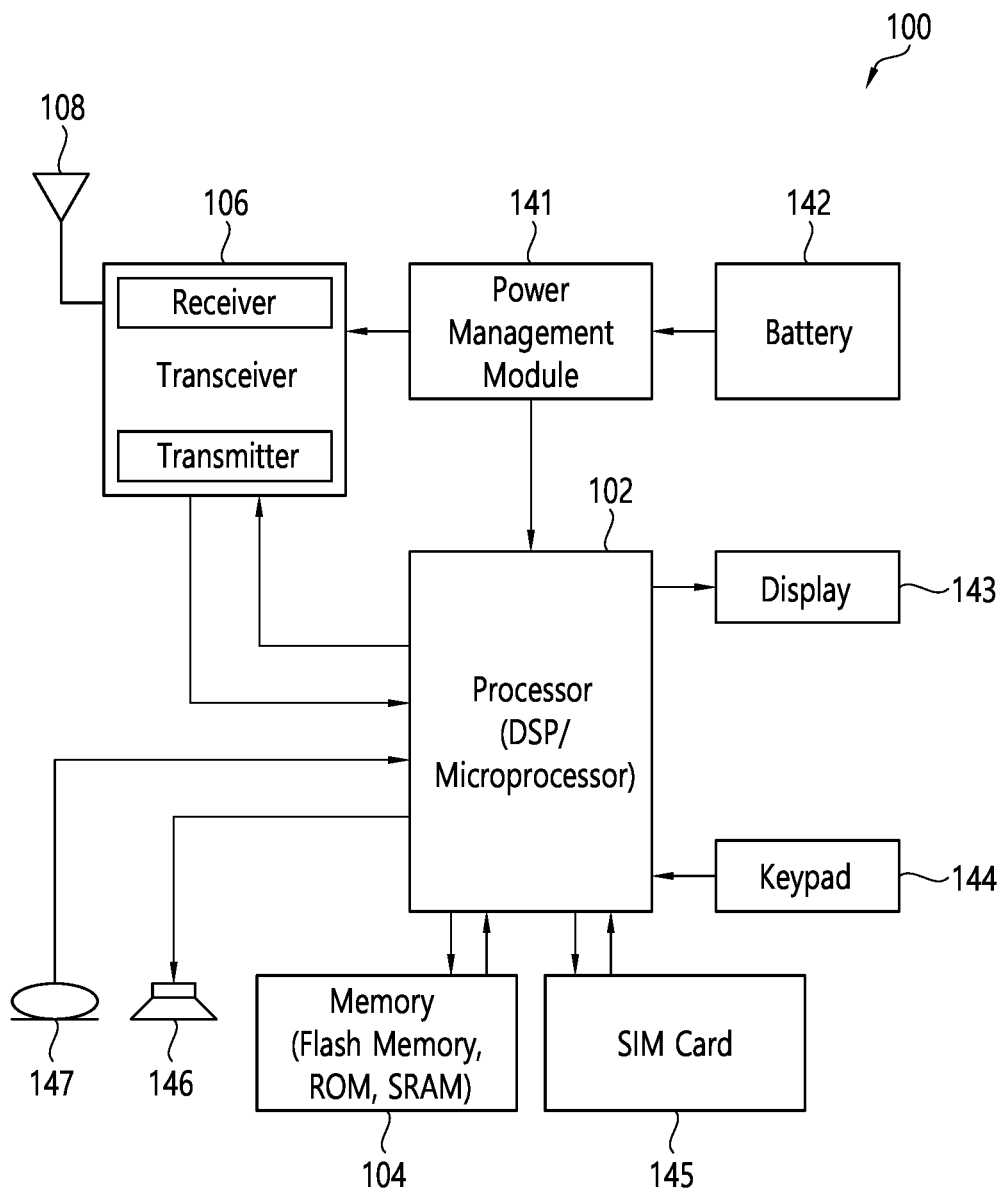
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 141, a battery 142, a display 143, a keypad 144, a subscriber identification module (SIM) card 145, a speaker 146, and a microphone 147.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142v supplies power to the power management module 110.

The display 143 outputs results processed by the processor 102. The keypad 144 receives inputs to be used by the processor 102. The keypad 144 may be shown on the display 143.

The SIM card 145 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 5:
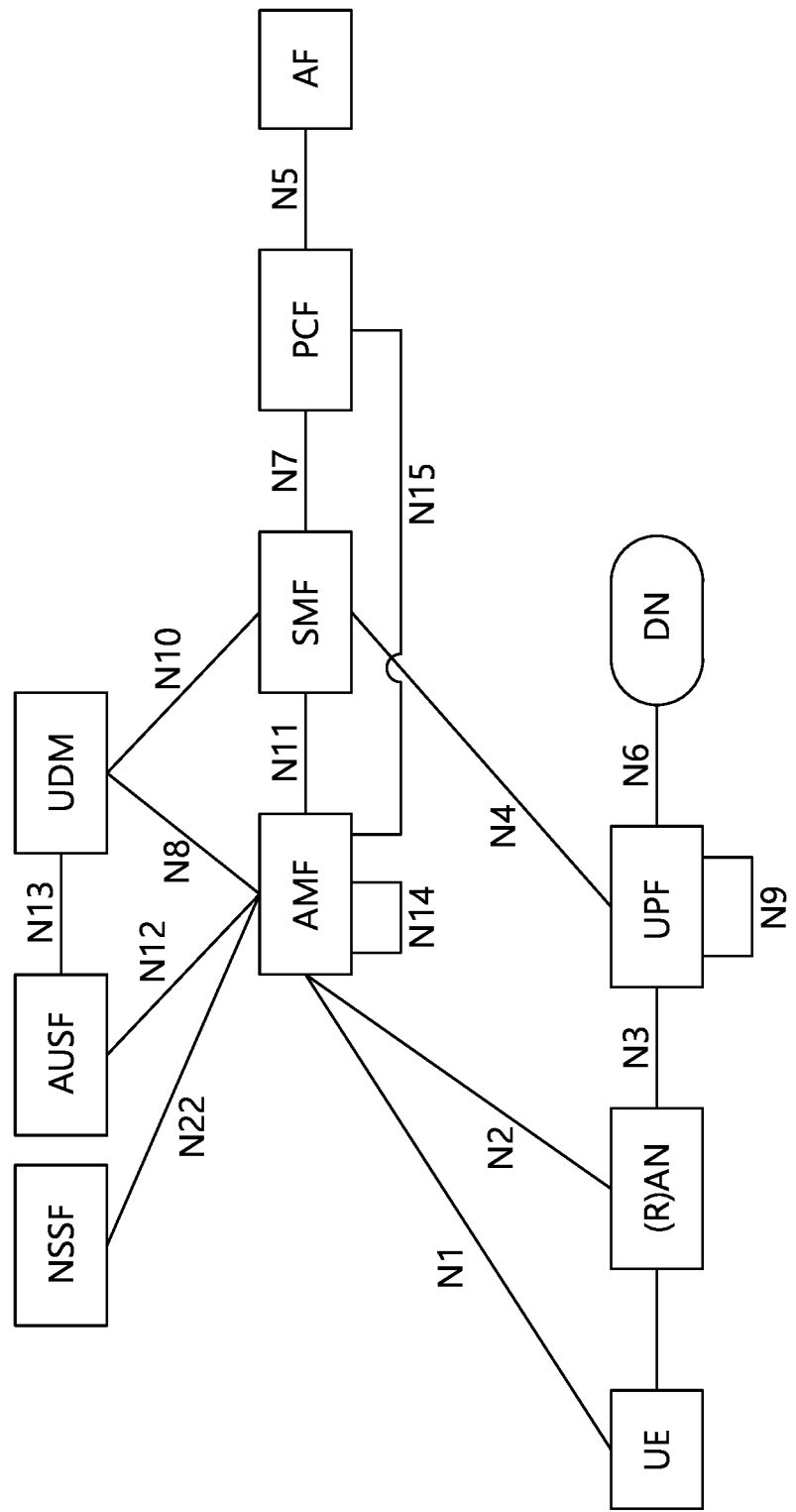
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Furthermore, the following network functions may be considered.

Non-3GPP InterWorking Function (N3IWF)
Trusted Non-3GPP Gateway Function (TNGF)
Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two UPFs.

The following reference points show the interactions that exist between the NF services in the NFs.

N5: Reference point between the PCF and an AF.
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.

N13: Reference point between the UDM and the AUSF.

N14: Reference point between two AMFs.

N15: Reference point between the PCF and the AMF in the case of non-roaming scenario, PCF in the visited network and AMF in the case of roaming scenario.

N16: Reference point between two SMFs, (in roaming case between SMF in the visited network and the SMF in the home network).

N22: Reference point between the AMF and the NSSF.

In some cases, a couple of NFs may need to be associated with each other to serve a UE.

NWDAF is described. Sections 4 and 5 of 3GPP TS 23.288 V16.3.0 may be referred.

The NWDAF is part of the 5G system architecture exemplarily described in FIG. 5.

The NWDAF interacts with different entities for different purposes.

Data collection based on subscription to events provided by AMF, SMF, PCF, UDM, AF (directly or via NEF), and Operation Administration Maintenance (OAM);

Retrieval of information from data repositories (e.g., UDR via UDM for subscriber-related information);

Retrieval of information about NFs (e.g., from NRF for NF-related information);

On demand provision of analytics to consumers.

A single instance or multiple instances of NWDAF may be deployed in a public land mobile network (PLMN). If multiple NWDAF instances are deployed, the 5G system architecture supports deploying the NWDAF as a central NF, as a collection of distributed NFs, or as a combination of both.

When multiple NWDAFs exist, not all of them need to be able to provide the same type of analytics results, i.e., some of them can be specialized in providing certain types of analytics. An analytics ID information element (IE) is used to identify the type of supported analytics that NWDAF can generate.

NWDAF instance can be collocated with a 5GS NF.

The 5G system architecture allows the NWDAF to collect data from any 5GC NF. The NWDAF belongs to the same PLMN as the 5GC NF that provides the data.

The Nnf interface is defined for the NWDAF to request subscription to data delivery for a particular context, to cancel subscription to data delivery and to request a specific report of data for a particular context.

The 5G system architecture allows the NWDAF to retrieve the management data from the OAM by invoking OAM services.

In addition, the 5G system architecture allows any 5GC NF to request network analytics information from the NWDAF. The NWDAF belongs to the same PLMN as the 5GC NF that consumes the analytics information.

The Nnwdaf interface is defined for 5GC NFs, to request subscription to network analytics delivery for a particular context, to cancel subscription to network analytics delivery and to request a specific report of network analytics for a particular context.

The NWDAF provides analytics to 5GC NFs, and OAM.

Analytics information are either statistical information of the past events, or predictive information.

Different NWDAF instances may be present in the 5GC, with possible specializations per type of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of analytics ID(s) that it supports when registering to the NRF, in addition to other NRF registration elements of the NF profile. Other NFs requiring the discovery of an NWDAF instance that provides support for some specific type of analytics may query the NRF and include the analytics ID(s) that identifies the desired type of analytics for that purpose.

The consumers, i.e., 5GC NFs and OAM, decide how to use the data analytics provided by NWDAF.

The interactions between 5GC NF and the NWDAF take place within a PLMN.

The NWDAF has no knowledge about NF application logic. The NWDAF may use subscription data but only for statistical purpose.

The NWDAF service consumer selects an NWDAF that supports requested analytics information by using the NWDAF discovery principles.

UE mobility analytics, from among UE related analytics which may be provided by the NWDAF, are described. Section 6.7.2 of 3GPP TS 23.288 V16.3.0 may be referred.

NWDAF supporting UE mobility statistics or predictions should be able to collect UE mobility related information from NF, OAM, and to perform data analytics to provide UE mobility statistics or predictions.

The service consumer may be a NF (e.g., AMF).

The consumer of these analytics may indicate in the request the followings:

The Target of Analytics Reporting which is a single UE or a group of UEs.

Analytics Filter Information optionally containing: Area of Interest, maximum number of objects An Analytics target period: indicates the time period over which the statistics or predictions are requested.

Preferred level of accuracy of the analytics (low/high)

In a subscription, the Notification Correlation ID and the Notification Target Address are included.

The NWDAF supporting data analytics on UE mobility should be able to collect UE mobility information from OAM, 5GC and AFs. The detailed information collected by the NWDAF may be Minimization of Drive Tests (MDT) data from OAM, network data from 5GC and/or service data from AFs.

UE mobility information from OAM is UE location carried in MDT data.

Network data related to UE mobility from 5GC is UE location information as defined in Table 3.

TABLE 3

| Information | Source | Description |
| --- | --- | --- |
| UE ID | AMF | Subscription Permanent Identifier (SUPI) |
| UE locations (1 . . . max) | AMF | UE positions |
| >UE location | | TA or cells that the UE enters |
| >Timestamp | | A time stamp when the AMF detects the UE enters this location |
| Type Allocation code (TAC) | AMF | To indicate the terminal model and vendor information of the UE. The UEs with the same TAC may have similar mobility behavior. The UE whose mobility behavior is unlike other UEs with the same TAC may be an abnormal one. |
| Frequent Mobility Registration Update | AMF | A UE (e.g., a stationary UE) may re-select between neighbour cells due to radio coverage |

TABLE 3-continued

| Information | Source | Description |
|---|---|---|
| | | fluctuations. This may lead to multiple Mobility Registration Updates if the cells belong to different registration areas. The number of Mobility Registration Updates N within a period M may be an indication for abnormal ping-pong behavior, where N and M are operator's configurable parameters. |

Service data related to UE mobility provided by AFs is defined in Table 4.

TABLE 4

| Information | Description |
|---|---|
| UE ID | Could be external UE ID (i.e., GPSI) |
| Application ID | Identifying the application providing this information |
| UE trajectory (1 ... max) | Timestamped UE positions |
| >UE location | Geographical area that the UE enters |
| >Timestamp | A time stamp when UE enters this area |

Depending on the requested level of accuracy, data collection may be provided on samples (e.g., spatial subsets of UEs or UE group, temporal subsets of UE location information).

The application ID is optional. If the application ID is omitted, the collected UE mobility information may be applicable to all the applications for the UE.

The NWDAF supporting data analytics on UE mobility should be able to provide UE mobility analytics to consumer NFs or AFs. The analytics results provided by the NWDAF may be UE mobility statistics as defined in Table 5, UE mobility predictions as defined in Table 6.

TABLE 5

| Information | Description |
|---|---|
| UE group ID or UE ID | Identifies a UE or a group of UEs (e.g., internal group ID) |
| Time slot entry (1 ... max) | List of time slots during the Analytics target period |
| >Time slot start | Time slot start within the Analytics target period |
| >Duration | Duration of the time slot (average and variance) |
| >UE location (1 ... max) | Observed location statistics |
| >>UE location | TA or cells which the UE stays |
| >>Ratio | Percentage of UEs in the group (in the case of an UE group) |

TABLE 6

| Information | Description |
|---|---|
| UE group ID or UE ID | Identifies an UE or a group of UEs (e.g., internal group ID) |
| Time slot entry (1 ... max) | List of predicted time slots |
| >Time slot start | Time slot start time within the Analytics target period |
| >Duration | Duration of the time slot |
| >UE location (1 ... max) | Predicted location prediction during the Analytics target period |

TABLE 6-continued

| Information | Description |
|---|---|
| >>UE location | TA or cells where the UE or UE group may move into |
| >>Confidence | Confidence of this prediction |
| >>Ratio | Percentage of UEs in the group (in the case of an UE group) |

When target of analytics reporting is an individual UE, one UE ID (i.e., SUPI) is included, the NWDAF provides the analytics mobility result (i.e., list of (predicted) time slots) to NF service consumer(s) for the UE.

The results for UE groups address the group globally. The ratio is the proportion of UEs in the group at a given location at a given time.

The number of time slots and UE locations is limited by the maximum number of objects provided as input parameter.

The time slots are provided by order of time, possibly overlapping. The locations are provided by decreasing value of ratio for a given time slot. The sum of all ratios on a given time slot is equal or less than 100%. Depending on the list size limitation, the least probable locations on a given Analytics target period may not be provided.

Figure 6:
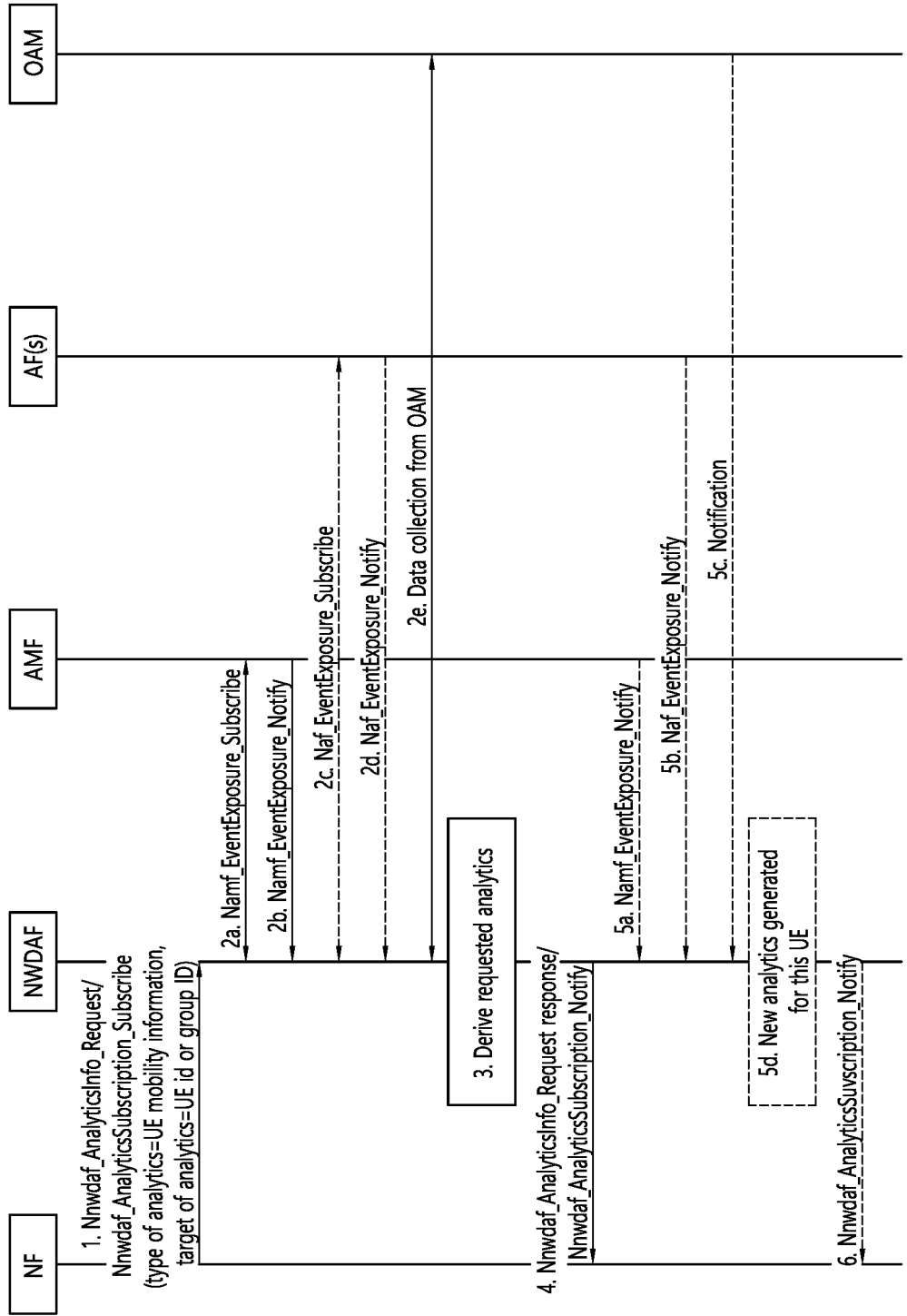
FIG. 6 shows an example of a method of providing UE mobility analytics provided to an NF to which implementations of the present disclosure is applied.

FIG. 6 shows an example of a method of providing UE mobility analytics provided to an NF to which implementations of the present disclosure is applied.

The NWDAF may provide UE mobility related analytics, in the form of statistics or predictions or both, to another NF. If the NF is an AF, and when the AF is untrusted, the AF requests analytics via the NEF, and the NEF then conveys the request to the NWDAF.

1. The NF sends a request to the NWDAF for analytics on a specific UE or a group of UEs, using either the Nnwdaf_AnalyticsInfo or Nnwdaf_AnalyticsSubscription service. The NF may request statistics or predictions or both. The type of analytics is set to UE mobility information. The NF provides the UE ID or Internal Group ID in the Target of Analytics Reporting.

2. If the request is authorized, and in order to provide the requested analytics, the NWDAF may subscribe to events with all the serving AMFs for notification of location changes. This step may be skipped when, e.g., the NWDAF already has the requested analytics available.

The NWDAF subscribes the service data from AF(s) in Table 4 above by invoking Naf_EventExposure_Subscribe service or Nnef_EventExposure_Subscribe (if via NEF).

The NWDAF collects UE mobility information from OAM, following the procedure.

The NWDAF determines the AMF serving the UE or the group of UEs.

3. The NWDAF derives requested analytics.

4. The NWDAF provide requested UE mobility analytics to the NF, using either the Nnwdaf_AnalyticsInfo_Request response or Nnwdaf_AnalyticsSubscription_Notify, depending on the service used in step 1. The details for UE mobility analytics provided by the NWDAF were described earlier.

5-6. If at step 1, the NF has subscribed to receive notifications for UE mobility analytics, after receiving event notification from the AMFs, AFs and OAM subscribed by NWDAF in step 2, the NWDAF may generate new analytics and provide them to the NF.

3GPP is actively working on enhancing services by utilizing user information analyzed by NWDAF. When a service provider outside the 5G network utilizes user information stored within the 5G network, even if there is an agreement between the service provider and the network operator, user data may contain sensitive information including user location, communication frequency, and communication time, and user consent is required to utilize such information. Therefore, from a security perspective, a method for obtaining user consent in a safe and secure manner may be required.

According to implementations of the present disclosure, a new parameter may be added to the subscription information managed by the UDM to store the user's (prior) consent to the collection and utilization of the data. User consent may be checked at the time of creating the subscription information, and the absence of user consent may be considered as non-consent by default. When an external entity (e.g., a service consumer outside the 5G network) requests data utilization from an NWDAF within the 5G network, the NWDAF may check with the UDM if there is user consent for that request. Based on the subscription information stored in the UDM, the NWDAF may perform the requested action if there is user consent, or refuse to perform the requested action if there is no consent.

According to implementations of the present disclosure, in the absence of (prior) consent to collect and utilize user data, an external entity (e.g., a service consumer outside the 5G network) may separately obtain user consent from the UE and deliver it to the network. In this case, the user consent may be integrity-protected with a secret key (e.g., HASH) known only to the UE and the network. The network may verify the user consent with the secret key and update the subscription information if the verification passes.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
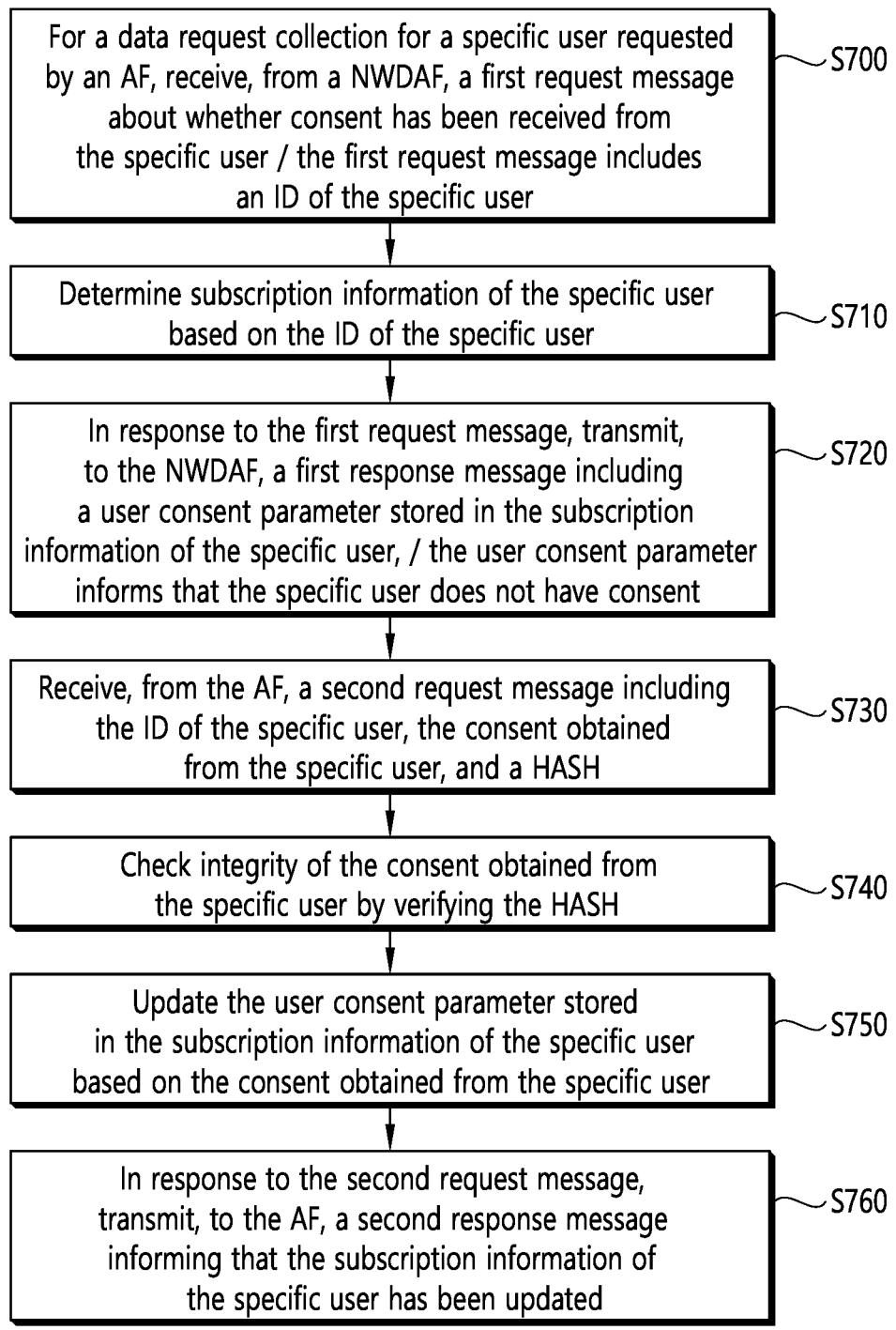
FIG. 7 shows an example of a method performed by a UDM to which implementations of the present disclosure is applied.

FIG. 7 shows an example of a method performed by a UDM to which implementations of the present disclosure is applied.

In step S700, the method comprises, for a data request collection for a specific user requested by an AF, receiving, from a NWDAF, a first request message about whether consent has been received from the specific user. The first request message includes an ID of the specific user.

In some implementations, the data request collection for the specific user may include collecting information about mobility of the specific user and/or information about communication behavior of the specific user.

In step S710, method comprises determining subscription information of the specific user based on the ID of the specific user.

In step S720, the method comprises, in response to the first request message, transmitting, to the NWDAF, a first response message including a user consent parameter stored in the subscription information of the specific user. The user consent parameter informs that the specific user does not have consent.

In some implementations, the consent of the specific user may be checked and stored when the subscription information of the specific user is created.

In some implementations, the user consent parameter may have a default value of "non-consent".

In some implementations, the method may further comprise, based on absence of the consent from the specific user, checking whether the specific user has consent via an AMF.

In some implementations, the data request collection for the specific user requested by the AF may be rejected by the NWDAF based on the absence of the consent from the specific user.

In step S730, the method comprises receiving, from the AF, a second request message including the ID of the specific user, the consent obtained from the specific user, and a HASH.

In step S740, the method comprises checking integrity of the consent obtained from the specific user by verifying the HASH.

In step S750, the method comprises updating the user consent parameter stored in the subscription information of the specific user based on the consent obtained from the specific user.

In step S760, the method comprises, in response to the second request message, transmitting, to the AF, a second response message informing that the subscription information of the specific user has been updated.

In some implementations, the method may further comprise, after transmitting the second response message to the AF, receiving, from the NWDAF, a third request message for the data request collection for the specific user requested by the AF, and in response to the third request message, transmitting, to the NWDAF, a third response message including an updated user consent parameter. Data for the specific user requested by the AF may be forwarded from the NWDAF to the AF.

In some implementations, the AF may be a service provider outside a 5G core network.

Figure 8:
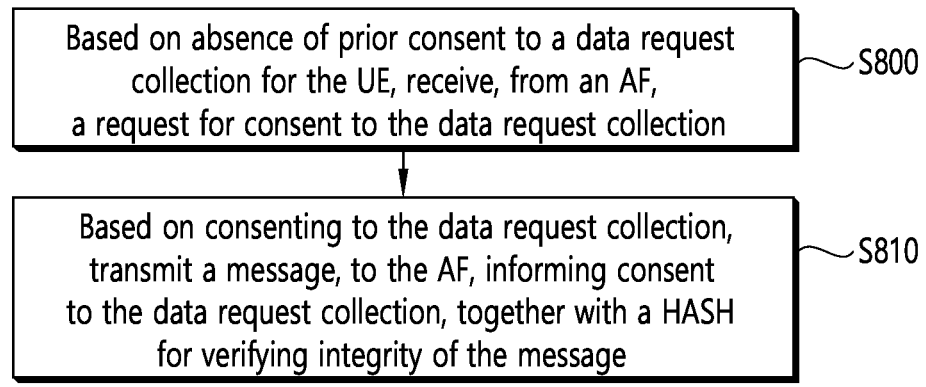
FIG. 8 shows an example of a method performed by a UE to which implementations of the present disclosure is applied.

FIG. 8 shows an example of a method performed by a UE to which implementations of the present disclosure is applied.

In step S800, the method comprises, based on absence of prior consent to a data request collection for the UE, receiving, from an AF, a request for consent to the data request collection.

In step S810, the method comprises, based on consenting to the data request collection, transmitting a message, to the AF, informing consent to the data request collection, together with a HASH for verifying integrity of the message.

In some implementations, the HASH may be generated based on a secret key and a KDF used for registration in a 5G core network.

In some implementations, the UE may be in communication with at least one of a mobile device, a network, and/or autonomous vehicles other than the UE.

Furthermore, the method in perspective of the UE described above in FIG. 7 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

Based on absence of prior consent to a data request collection for the UE, the UE receives, from an AF via the at least one transceiver, a request for consent to the data request collection.

Based on consenting to the data request collection, the UE transmits a message, to the AF via the at least one transceiver, informing consent to the data request collection, together with a HASH for verifying integrity of the message.

In some implementations, the HASH may be generated based on a secret key and a KDF used for registration in a 5G core network.

Furthermore, the method in perspective of the UE described above in FIG. 7 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: based on absence of prior consent to a data request collection for the UE, obtaining a request for consent to the data request collection, and based on consenting to the data request collection, generating a message informing consent to the data request collection, and a HASH for verifying integrity of the message.

Furthermore, the method in perspective of the UE described above in FIG. 7 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions to cause at least one processor to perform operations. The operations comprise: based on absence of prior consent to a data request collection for the UE, obtaining a request for consent to the data request collection, and based on consenting to the data request collection, generating a message informing consent to the data request collection, and a HASH for verifying integrity of the message.

Figure 9:
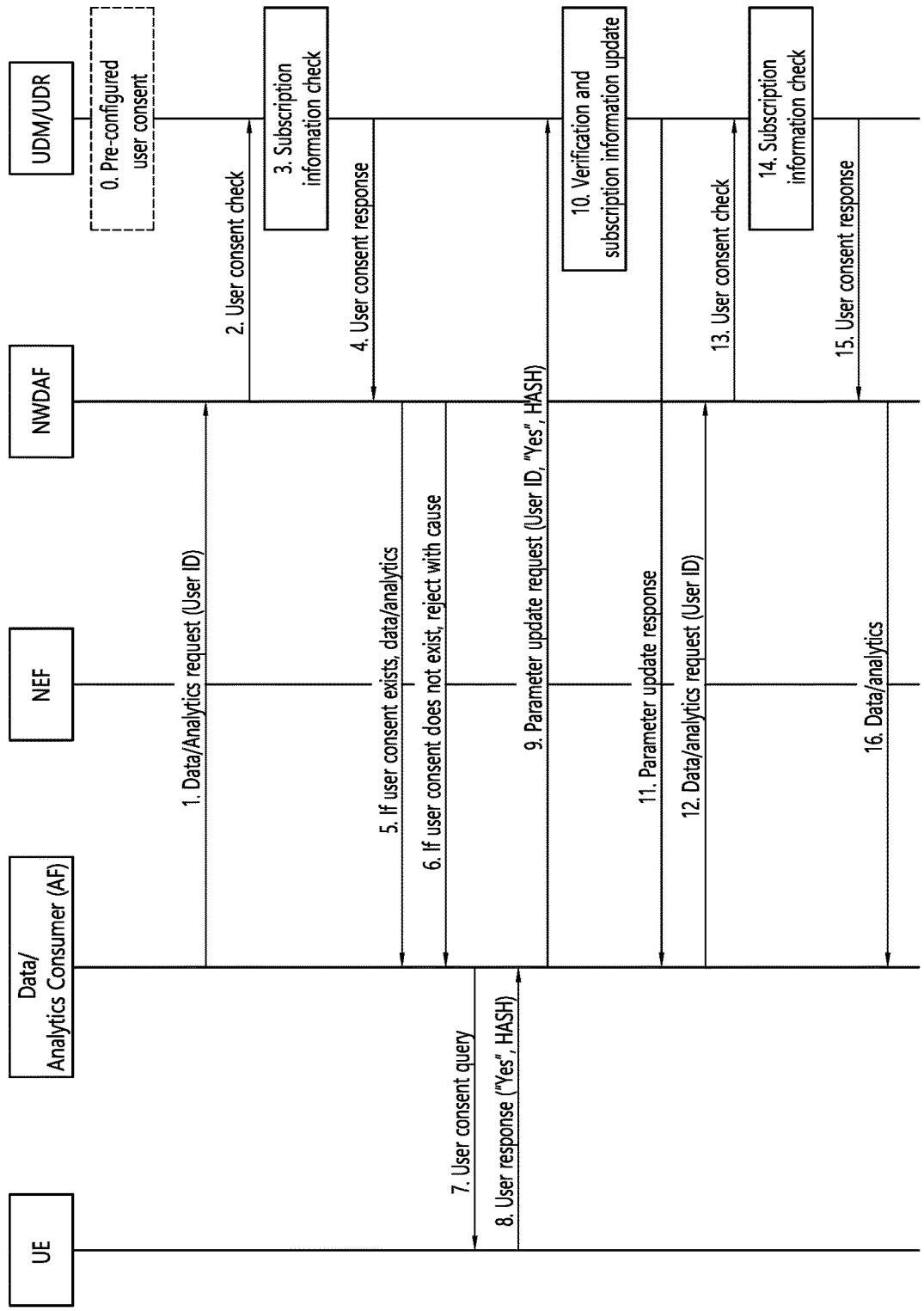
FIG. 9 shows an example of a user consent handling mechanism for collecting data from NWDAF to which implementations of the present disclosure is applied.

FIG. 9 shows an example of a user consent handling mechanism for collecting data from NWDAF to which implementations of the present disclosure is applied.

A user consent may be collected as a subscription data or by the service provider on its own way. For the latter case, it is required that the user consent needs to be verifiable by the network.

0. A network operator may obtain the user consent from the user for collection UE related data and sharing it with other entities when creating the subscription information, and store the user consent information in the subscription information per user.

1. In order for an external AF (e.g., data/analytics consumer) to utilize UE data or analytics managed by the NWDAF within the 3GPP 5G core network, the AF transmits an analytics data request message including the ID of the corresponding user to the NWDAF. For example, the AF may send a data/analytics request (e.g., using Nnwdaf_AnalyticsInfo_Request) or data/analytics subscription request (e.g. using Nnwdaf_AnalyticsSubscription_Subscribe Request) including the interested user ID to the NWDAF.

2. If the data/analytics requested by the AF is UE related information (e.g., mobility related information, communication behavior related information), user consent is required for the NWDAF to provide the data/analytics to the external AF. Since the information about user consent is stored and managed by the UDM/UDR, the NWDAF requests the UDM to check user consent, including the corresponding user ID provided by the AF, before triggering some UE data specific analytics and data collection.

3. The subscription information stored and managed by the UDM/UDR per user may include a new parameter (e.g., a user consent parameter) to indicate whether the user has given consent to the provision of user data externally. This parameter may have a value of "Yes" or "No", and prior consent may be obtained by the service provider at any time and in any manner they choose. If there is no prior consent, the parameter may have a default value of "No". If no prior consent is configured, the UDM may also transmit a signaling message to the UE via AMF to confirm user consent.

4. Upon receiving a user consent request from the NWDAF, the UDM checks the subscription information that is associated with the corresponding user ID and responds to the NWDAF with the user consent parameters stored in the corresponding subscription information.

5. If the corresponding user provides prior consent, the NWDAF delivers the data/analytics requested in Step 1 to the AF.

6. If the corresponding user does not provide prior consent, the NWDAF rejects to deliver the data/analytics requested in step 1 and notifies the AF that the reason for the refusal is absence of user consent.

The AF needs to obtain the user's consent to obtain the user's data/analytics from the NWDAF, and may perform the operations in steps 7 through 16 below to do so.

7. If there is no prior consent stored in the UDM for the corresponding user, the AF may independently query the UE for user consent.

The user consent query and verification process between the AF and UE may be performed on its own way. However, the response message transmitted by the UE may need to be standardized as it will later be forwarded by the AF to the UDM and needs to be securely validated. If the UE agrees to provide its data to the corresponding AF, the UE may reply to the AF with a standardized affirmative message (e.g., "Agree" or "Yes") along with a HASH message that can be used to verify the integrity of the affirmative message. The HASH message may be generated by utilizing a standardized Key Derivation Function (KDF) with the long-term key which is used for authentication upon registration in the 5G core network and the standardized affirmative message as input. The HASH message is used to prove that the user consent is genuinely obtained by the UE.

9. The AF may transmit a parameter update request message to the UDM. The parameter update request message may include the user ID, the user consent information informing that the AF has obtained user consent from the UE, and the HASH message proving that the user consent has not changed. The parameter update request message may be transmitted via NEF if required.
10. The UDM may find the subscription information corresponding to the received user ID and verify the user consent information along with the HASH message using the long-term key with which the corresponding user ID is associated. If the verification is passed, the UDM may update the subscription information with the provided user consent information.
11. After updating the subscription information, the UDM may transmit the result back to the AF.
12. The AF may retry the request for user data/analytics to the NWDAF. This may be the same as in step 1.
13. The NWDAF may request the UDM to check user consent, including the corresponding user ID provided by the AF, before triggering some UE data specific analytics and data collection. This may be the same as in step 2.
14. Upon receiving a user consent request from the NWDAF, the UDM may check the subscription information that is associated with the corresponding user ID and. This may be the same as step 3. However, since the subscription information was updated in step 10, the user consent information is now stored as "Yes".
15. The UDM may respond to the NWDAF with the user consent parameters stored in the corresponding subscription information. This may be the same as in step 4.

Since the user has prior consent, the NWDAF may forward the data/analytics requested in step 12 to the AF. That is, the AF may receive the requested data/analytics from the NWDAF this time.

The present disclosure can have various advantageous effects.

For example, if an external service utilizes user data stored and managed by network, the necessary user consent can be obtained verifiably.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising;
for a data request collection for a specific user requested by an application node, receiving, from a network data analytics node, a first request message about whether consent has been received from the specific user, wherein the first request message includes an identifier (ID) of the specific user;
determining subscription information of the specific user based on the ID of the specific user;
in response to the first request message, transmitting, to the network data analytics node, a first response message including a user consent parameter stored in the subscription information of the specific user, wherein the user consent parameter informs that the specific user does not have consent;
receiving, from the application node, a second request message including the ID of the specific user, the consent obtained from the specific user, and a HASH;
checking integrity of the consent obtained from the specific user by verifying the HASH;
updating the user consent parameter stored in the subscription information of the specific user based on the consent obtained from the specific user; and
in response to the second request message, transmitting, to the application node, a second response message informing that the subscription information of the specific user has been updated.

2. The method of claim 1, wherein the data request collection for the specific user includes collecting information about mobility of the specific user and/or information about communication behavior of the specific user.

3. The method of claim 1, wherein the consent of the specific user is checked and stored when the subscription information of the specific user is created.

4. The method of claim 1, wherein the user consent parameter has a default value of "non-consent".

5. The method of claim 1, wherein, based on absence of the consent from the specific user, the method further comprises checking whether the specific user has consent via an Access and mobility Management Function (AMF).

6. The method of claim 1, wherein the data request collection for the specific user requested by the application node is rejected by the NWDAF network data analytics node based on the absence of the consent from the specific user.

7. The method of claim 1, wherein the method further comprises:
after transmitting the second response message to the application node,
receiving, from the network data analytics node, a third request message for the data request collection for the specific user requested by the application node; and
in response to the third request message, transmitting, to the network data analytics node, a third response message including an updated user consent parameter.

8. The method of claim 7, wherein data for the specific user requested by the application node is forwarded from the NWDAF network data analytics node to the application node.

9. The method of claim 1, wherein the application node is a service provider outside a 5G core network.

10. A method comprising:
based on absence of prior consent to a data request collection for a user equipment (UE), receiving, from an application node, a request for consent to the data request collection; and
based on consenting to the data request collection, transmitting a message, to the application node, informing consent to the data request collection, together with a HASH for verifying integrity of the message.

11. The method of claim 10, wherein the HASH is generated based on a secret key and a Key Derivation Function (KDF) used for registration in a 5G core network.

12. The method of claim 1, wherein the UE is in communication with at least one of a mobile device, a network, and/or autonomous vehicles other than the UE.

13. A user equipment (UE) comprising:
at least one transceiver;
at least one processor; and
at least one memory operably connectable to the at least one processor and storing instructions that, based on being executed by the at least one processor, perform operations comprising:
based on absence of prior consent to a data request collection for the UE, receiving, from an application node via the at least one transceiver, a request for consent to the data request collection; and
based on consenting to the data request collection, transmitting a message, to the application node via the at least one transceiver, informing consent to the data request collection, together with a HASH for verifying integrity of the message.

14. The UE of claim 13, wherein the HASH is generated based on a secret key and a Key Derivation Function (KDF) used for registration in a 5G core network.

* * * * *